(12) United States Patent
Whitmarsh

(10) Patent No.: US 6,958,824 B2
(45) Date of Patent: Oct. 25, 2005

(54) SYSTEM AND METHOD FOR ACCESSING AND USING A COMMERCIAL PRINT SERVICE

(75) Inventor: Michael D. Whitmarsh, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 914 days.

(21) Appl. No.: 09/773,977

(22) Filed: Jan. 31, 2001

(65) Prior Publication Data

US 2002/0101608 A1    Aug. 1, 2002

(51) Int. Cl.[7] .................. G06F 15/00; G06F 15/16; G03G 15/00

(52) U.S. Cl. .................. 358/1.15; 399/8; 709/203

(58) Field of Search ................ 358/1.15; 713/200; 399/8, 81; 709/203, 227

(56) References Cited

U.S. PATENT DOCUMENTS

| | | | |
|---|---|---|---|
| 6,029,245 A * | 2/2000 | Scanlan | ............... 713/200 |
| 6,073,147 A | 6/2000 | Chan et al. | |
| 6,134,569 A | 10/2000 | Kot | |
| 6,453,127 B2 * | 9/2002 | Wood et al. | ............... 399/8 |

FOREIGN PATENT DOCUMENTS

| | | | |
|---|---|---|---|
| EP | 0054448 | 6/1982 | |
| EP | 0886206 A2 | 12/1998 | |
| EP | 1079299 A2 | 2/2001 | |
| EP | 1109113 A2 * | 6/2001 | ........... G06F 17/30 |
| EP | 1109113 A2 | 6/2001 | |
| EP | 1107569 | 7/2002 | |
| JP | 11073488 | 3/1999 | |
| WO | WO99/15955 | 4/1999 | |

* cited by examiner

Primary Examiner—Kimberly Williams
Assistant Examiner—Saeid Ebrahimi-Dehkordy

(57) ABSTRACT

A print service system and method. The method typically includes receiving a print request at a local client computing device, and displaying a remotely served print interface on the local client computing device. The print interface is typically configured to request a printing parameter relating to the print request. The method may further include creating a printable file in response to the print request, and sending the printable file and associated printing parameter from the local client computing device to a remote publisher for printing. The print interface may be served by a workflow application server associated with the print service, and the printable file may be temporarily uploaded to a repository before being downloaded to the remote publisher for printing. The local client computing device may include a browser, and the method may further include, after receiving the print request, opening the browser to an address from which the print interface is remotely served. The browser may be opened by a client initialization program, which may be called by a print driver associated with the print service.

25 Claims, 8 Drawing Sheets

SYSTEM AND METHOD FOR ACCESSING AND USING A COMMERCIAL PRINT SERVICE

TECHNICAL FIELD

This invention relates generally to printing, and more particularly to a system and method for accessing and using a remote print service from a local computer via a remotely served print interface.

BACKGROUND

With the advance of desktop publishing software, computer users increasingly are able to create complicated documents that require high-end printing and finishing services not found on printers designed for home and office use. For example, a user may desire to print large format documents, high-resolution color documents, bound documents, etc., which are beyond the capabilities of the user's home or office printer. In addition, a user may desire to print a large number of copies of a document, which would be slow and expensive if printed on the user's home or office printer. Users are currently forced to take these high-end and high-quantity document orders to commercial print houses for printing on advanced printers designed for high-speed, high-quality commercial use. Usually, the document is saved on a CD ROM or other portable storage medium, and shipped or carried to the commercial print house for processing. This process is slow and tedious and results in increased document production costs.

It would be desirable to provide a convenient system and method for accessing and using a commercial print service from a user's local home or office computer.

SUMMARY OF THE INVENTION

A print service system and method of using the same are provided. The method typically includes receiving a print request at a local client computing device, and displaying a remotely served print interface on the local client computing device. The print interface is typically configured to request a printing parameter relating to the print request. The method may further include creating a printable file in response to the print request, and sending the printable file and associated printing parameter from the local client computing device to a remote publisher for printing. The print interface may be served by a workflow application server associated with the print service, and the printable file and printing parameter may be uploaded temporarily to a repository before being downloaded to the remote publisher for printing. The local client computing device may include a browser, and the method may further include, after receiving the print request, opening the browser to an address from which the print interface is remotely served. The browser may be opened by a client initialization program, which may be called by a print driver associated with the print service.

According to another aspect of the invention, the method may include receiving a print request at a local client computing device and creating a printable file in response to the print request. The method may further include displaying a remotely served print interface on the local client computing device and requesting and receiving via the print interface printing parameters relating to the print request. The method also may include sending the printable file and the printing parameters to a selected remote publisher for printing.

The print service system typically includes a print service workflow application server configured to serve a print interface via a wide area network, and a local computing device configured to receive a print request from the user and, in response, download and display a print interface from the workflow application server via the wide area network. The print interface is typically configured to receive a printing parameter relating to the print request. The printing parameter may be a print option such as number of copies, paper type, binding type, color print options, and imposition, a selected destination remote publisher associated with the print service, a shipping and/or billing address, payment information, or other suitable printing parameter. The local computing device is typically configured to generate a printable file relating to the print request. The local computing device also typically is configured to send the printable file to a remote publisher, either directly or via a repository.

According to another aspect of the invention, the print service system includes a local client computing device configured to connect to a wide area network, and a remote publisher server also configured to connect to the wide area network. The system further includes a repository server and associated database. The repository server also is configured to connect to the wide area network. The system further includes a print service workflow application server configured to connect to the wide area network. The local client computing device is configured to contact the print service workflow application server in response to receiving a print request, and the print service workflow application server is configured to instruct the local client computing device to upload a printable file associated with the print request to the repository server for storage in the repository database. In addition, the print service workflow application server is configured to instruct the remote publisher server to download the printable file from the repository for printing.

According to another aspect of the invention, a print service system utility is provided, which includes a print driver configured to open a browser to a predetermined address of a commercial print service. The print driver may be configured to open the browser to the predetermined address, by launching a client initialization program, which in turn is configured to open the browser to the predetermined address.

DETAILED DESCRIPTION OF THE EMBODIMENTS AND BEST MODE OF CARRYING OUT THE INVENTION

Figure 1:
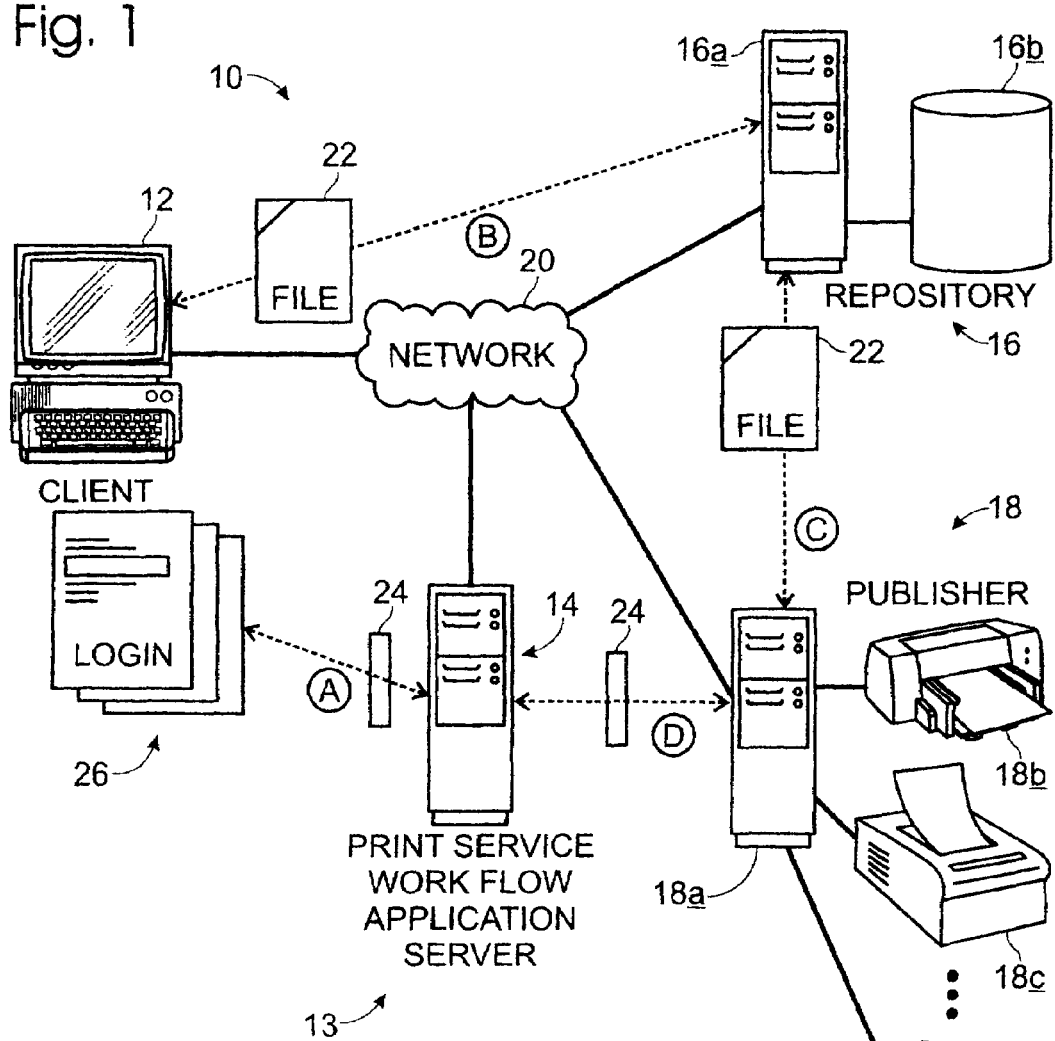
FIG. 1 is a schematic view of a print service system according to one embodiment of the present invention.

Turning initially to FIG. 1, a print service system according to one embodiment of the present invention is shown generally at 10. System 10 typically includes a local client computing device 12 configured to be selectively connectable via a computer network 20 to a remote print service 13, which includes a print service workflow application server 14, repository 16, and remote publisher 18. In response to a print request to print a document via remote print service 13, the client computing device is configured to access workflow application server 14 and download a print interface 26, as shown at dashed path A. Print service workflow application server 14 directs local client computing device 12 to send a printable file 22 to repository server 16a for temporary storage in repository database 16b, as shown at dashed path B. In addition, print service workflow application server 14 directs local client computing device 12 to return printing parameters 24 received via print interface 26 to workflow server 14, as shown at dashed path A. In turn, the print service workflow application server 14 instructs remote publisher server 18a to download printable file 22 from repository 16, as shown at dashed path C, and to download printing parameters 24 from workflow application server 14, as shown at dashed path D. Publisher 18 then fulfills the print request by printing the printable file 22 according to the printing parameters 24 on one of printers 18b–18d.

Figure 2:
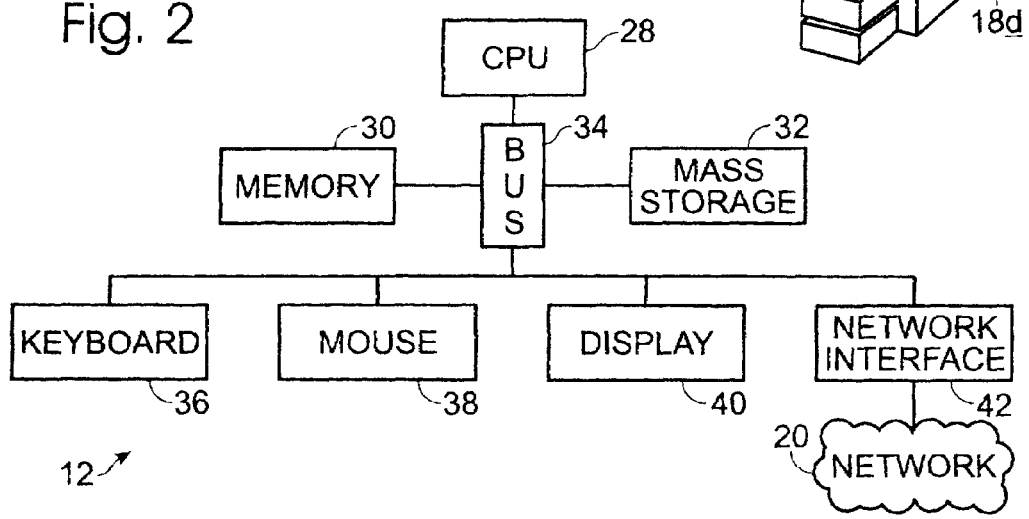
FIG. 2 is a schematic view of a local client computing device of the system of FIG. 1.

As shown in FIG. 2, local client computing device 12 is typically a personal computer including a central processing unit (CPU) 28 linked to a memory 30 and mass storage device 32 by a bus 34. Memory 30 typically includes random access memory (RAM), read-only memory (ROM), and basic input output routines necessary to start up computing device 12. Mass storage device 32 is typically a hard drive, however it will be appreciated that virtually any other suitable form of mass storage device may be used, such as a CD drive, magneto-optical drive, flash memory, floppy drive. Client computing device 12 also typically includes a keyboard 36, mouse 38, and display 40 linked via communication ports to bus 34. In addition, client computing device 12 includes a network interface 42 configured to link computer 12 to computer network 20. Software according to the embodiments of the present invention is typically stored on mass storage device 32 and loaded into portions of memory 30 when executed by CPU 28.

It also will be appreciated that workflow application server 14, repository server 16a, and remote publisher server 18a are typically computers having a similar hardware architecture to that shown in FIG. 2. While local client computing device 12 is typically a personal computer, it will be appreciated that computing device 12 may also be a portable data assistant (PDA), mainframe computer, or other form of computing device configured to generate printable documents and communicate via a computer network 20.

Figure 3:
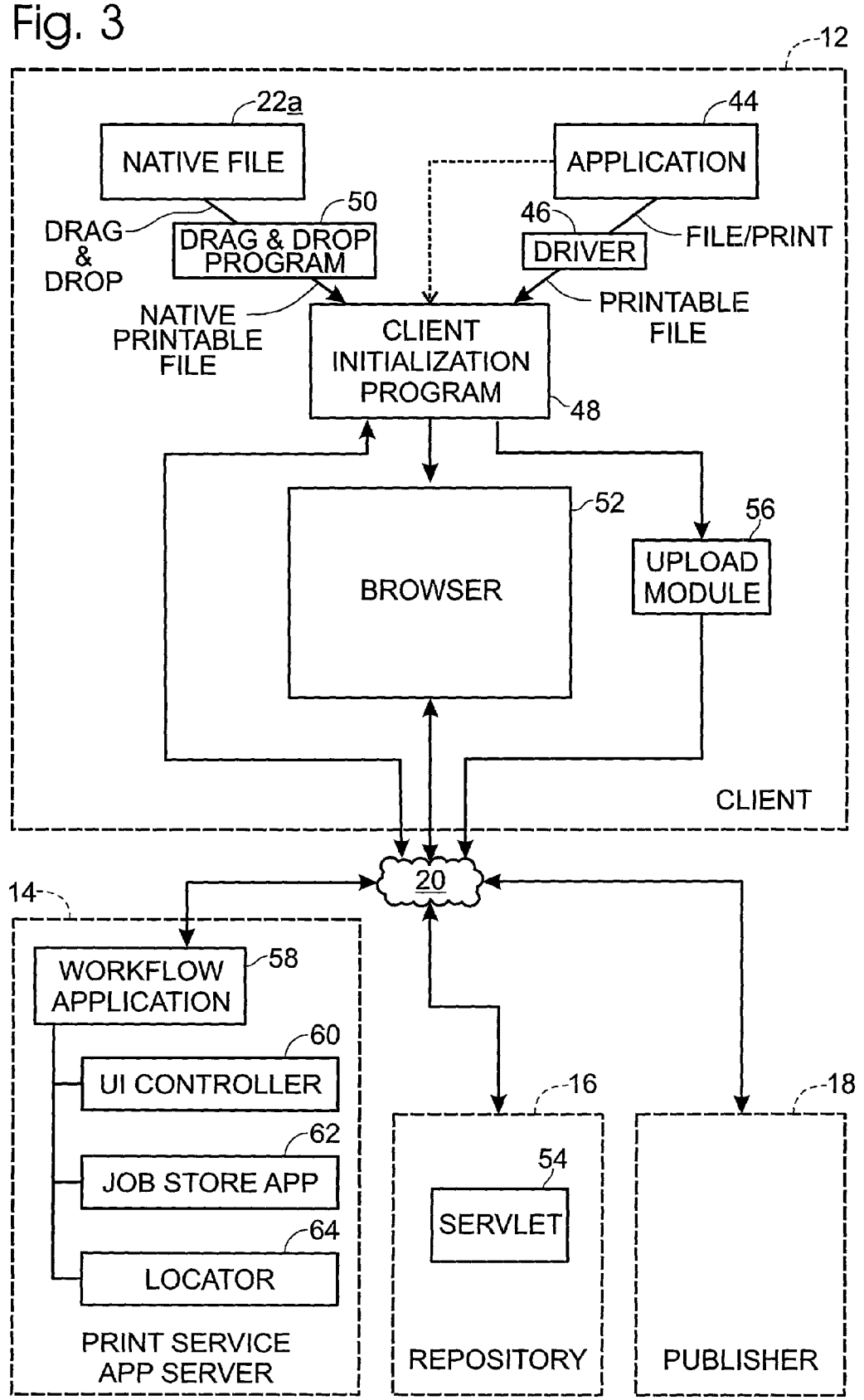
FIG. 3 is a schematic view of the software architecture of the system of FIG. 1.

As shown in FIG. 3, client 12 typically includes an application program 44 configured with a user-selectable print command, such as is featured in the file/print menu of many commercially available Windows operating system compatible applications. Client 12 also includes a print service print driver 46 configured to create a printable file 22. Typically, printable file 22 is a file in the portable document format (PDF) document. The PDF file may be locked. Information regarding the PDF format is commercially available from Adobe Systems Incorporated of San Jose, Calif. Alternatively, another file format may be used.

The print service print driver 46 is typically configured to call a client initialization program 48. The client initialization program is configured to contact the workflow application server 14 using an application server address via network 20, and download a user interface address and a repository or upload address. Each of these addresses is typically a Uniform Resource Locator (URL), although another suitable computer network address type may be used. Thus, these addresses may also be referred to as an application server URL, user interface URL, and upload URL. Typically, the application server URL is stored within the client initialization program software. The workflow application server URL may be periodically updated by the workflow application server 14. Because the upload URL and user interface URL are downloaded during each print service session, the location of the repository and print interface server may change dynamically according to the location and/or needs of the user.

Once the upload URL and user interface URL are downloaded, the client initialization program is configured to upload the printable file 22 to the repository 18 at the upload URL, and also to download and display print interface 26 from the user interface URL. Typically, but not necessarily, the user interface URL is served by workflow application server 14. Alternatively, another remote server may serve print interface 26. Upload module 56 may be configured to encrypt the printable file 22, 22a, to prevent unauthorized access to the file during the upload.

The client initialization program may receive the printable file 22 from the print service print driver 46, or alternatively may be configured to access the printable file 22 at a predetermined file path on computing device 12, in order to upload the printable file 22 to the repository. It will be appreciated that application program 44 also may be configured to launch client initialization program 48 directly, without use of a print driver 46.

Client computing device 12 also may include a native printable file 22a as well as a drag and drop utility program 50. Native printable file 22a may be virtually any type of printable file. For example native printable file 22a may be a file saved in an application-specific format, such as Microsoft® Word, Adobe® PageMaker®, Photoshop®, or Illustrator® formats, or may be in an application-neutral format such as the rich text format (RTF), jpeg format, or gif format, or in virtually any other printable format. Native printable file 22a is referred to herein as "native" because it has not been altered by a print driver to produce a driver-specific printable file.

A user typically drops an icon representing the native printable file 22a on an icon representing the drag and drop utility program 50. In response, drag and drop utility 50 is configured to pass the native printable file 22a to client initialization program 48. The native printable file 22a typically is sent to client initialization program 48 directly, or alternatively is made accessible to client initialization program 48 at a predetermined file path on local client computing device 12.

Local client computing device 12 also includes a browser application 52 configured to access web pages and other web resources on remote servers such as print service workflow application server 14. Exemplary browsers that may be used in accordance with the embodiments of the present invention include the Netscape browser commercially available from Netscape Communications Corporation of Santa Clara, Calif., or the Internet Explorer browser commercially available from Microsoft Corporation of Redmond, Wash. When a user chooses to print the printable file via remote print service 13 either by dragging and dropping native printable file 22a or by choosing remote print service print driver 46, client initialization program 48 is configured to launch and/or open browser 52 to a predetermined address, typically a uniform resource locator (URL), via print interface 26 remotely served from print service workflow application server 14.

Local client computing device 12 also includes an associated upload module 56 configured to upload the printable file 22, 22a to a preselected upload site. Hereinafter, printable file 22 may be used to refer collectively to printable files 22 and 22a. The preselected upload site is typically repository 16, and the upload module 56 is configured to communicate with servlet 54 to upload printable file 22 to the repository.

Print service workflow application server 14 typically is configured to direct the uploading and downloading of the printable file and printing parameters along paths B, C, and D in FIG. 1. Alternatively, the printable file and/or printing parameters may be directly uploaded from the local client computing device 12 to the remote publisher 18, or to the print service workflow application server 14. It also will be appreciated that, according to another embodiment of the invention, repository 16 and workflow application server 14 may be one server located at the same address on computer network 20.

Figure 10:
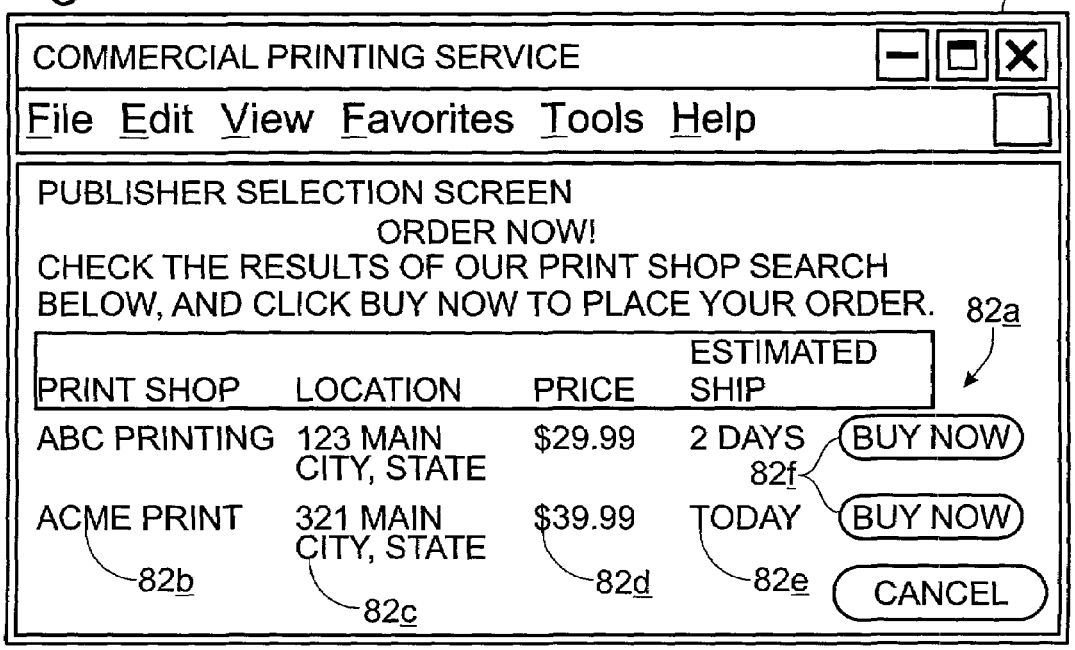
FIG. 10 is a destination publisher selection screen of the print interface of FIG. 1.

Print service workflow application server 14 typically includes a workflow application server program 58 having associated program elements including user interface controller 60 job store application 62 and publisher locator 64. User interface controller 60 is configured to serve print interface 26 to local client computing device 12, as shown at dashed line A, and typically serves pages located at the user interface URL described above. Job store application 62 is configured to direct the uploading and downloading of printable file 22, 22a and printing parameters 24. Publisher locator 64 is configured to determine a list of available publishers for display on a publisher selection screen 82 of print interface 26, as shown in FIG. 10.

Figure 4:
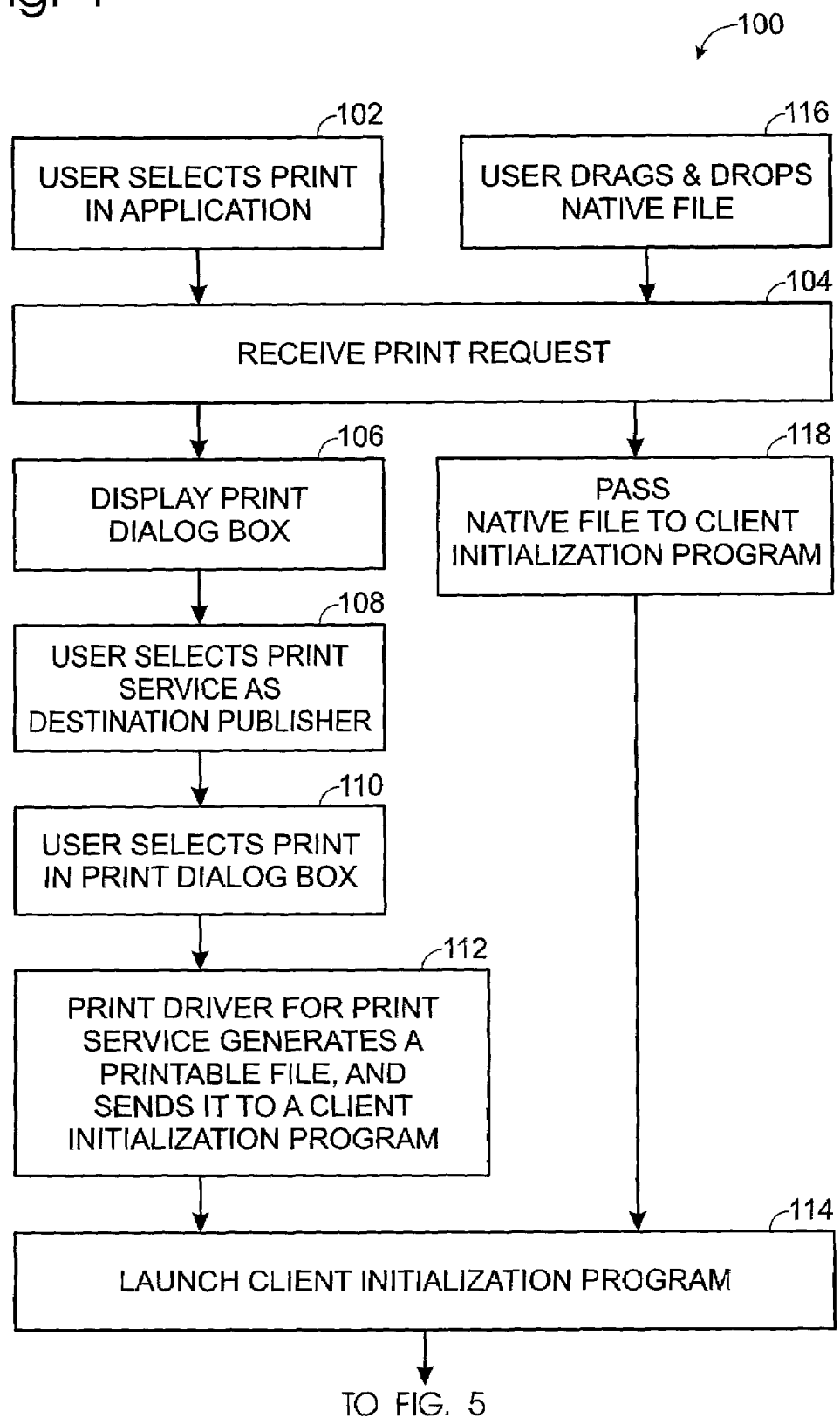
FIG. 4 is a flowchart of a method for using a print service according to one embodiment of the present invention.
Figure 5:
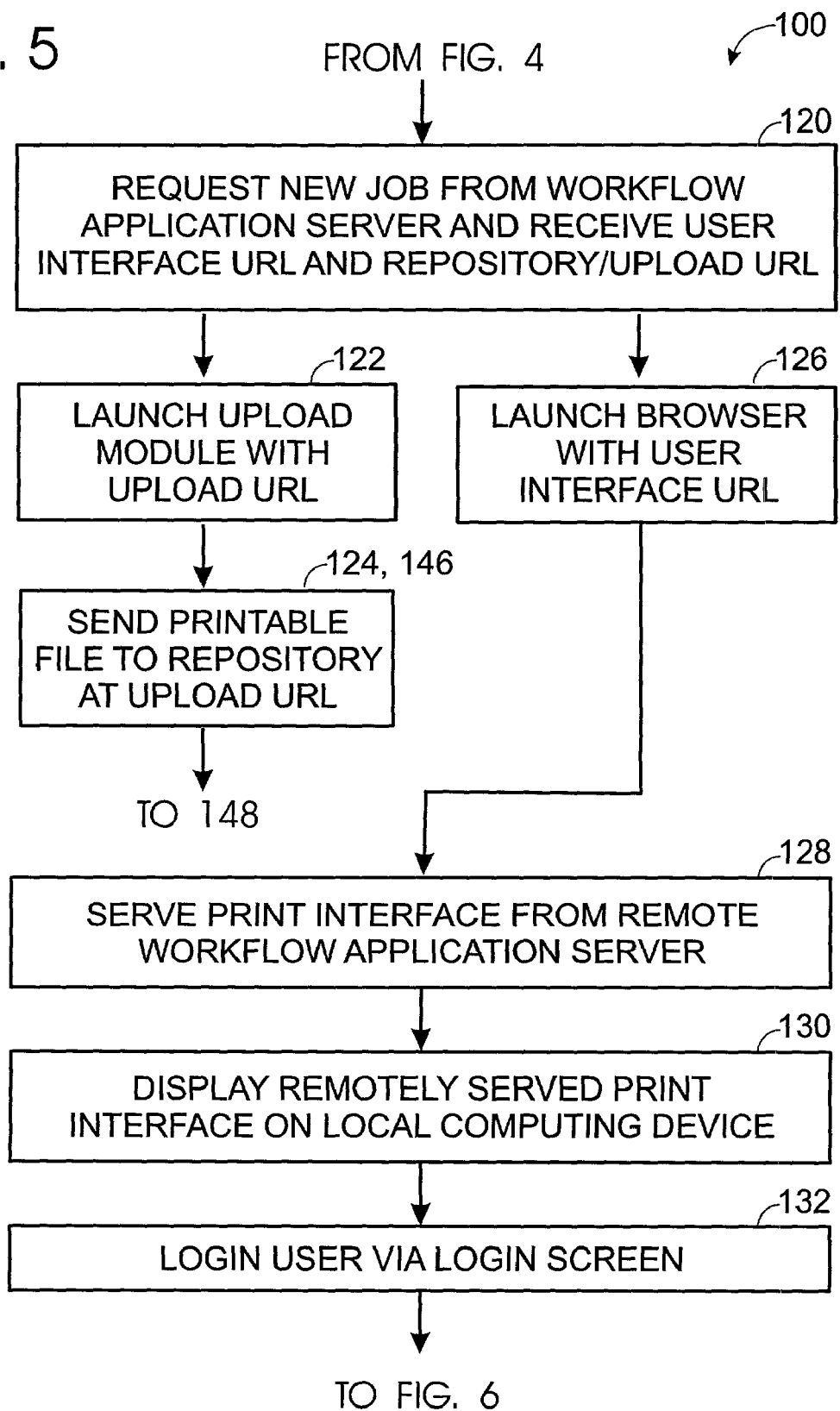
FIG. 5 is a continuation of the flowchart of FIG. 4.
Figure 6:
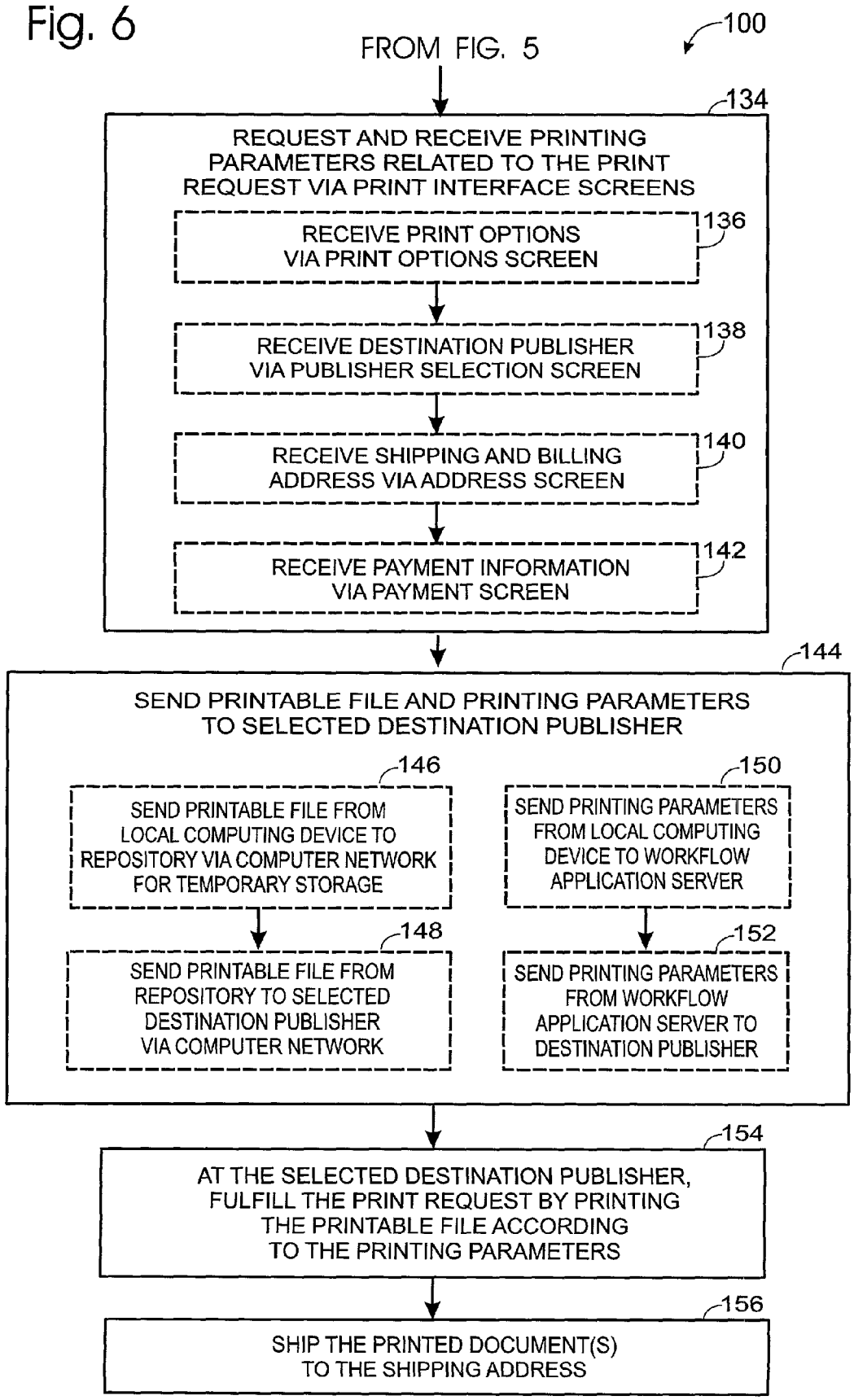
FIG. 6 is a continuation of the flowchart of FIG. 5.

Turning now to FIGS. 4–6, a method according to one embodiment of the present invention is shown generally at 100. Method 100 typically includes, at 102, a user selecting a print command in application program 44 running on local computing device 12. Typically, this is accomplished by selecting the file/print menu option, although virtually any other suitable print command may be selected by the user. At 104, the method typically includes, receiving the print request at local computing device 12.

Figure 7:
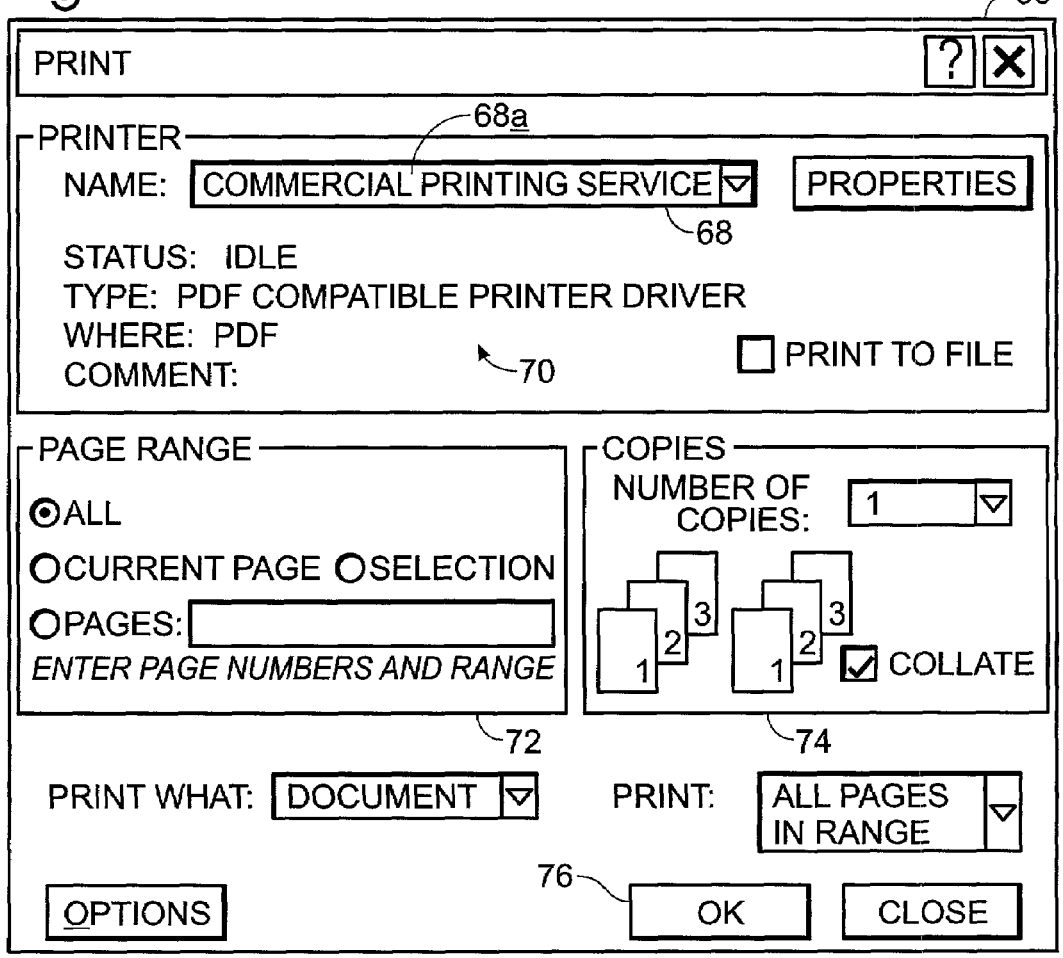
FIG. 7 is a print dialog menu displayed on a local client computing device of the system of FIG. 1.
Figure 8:
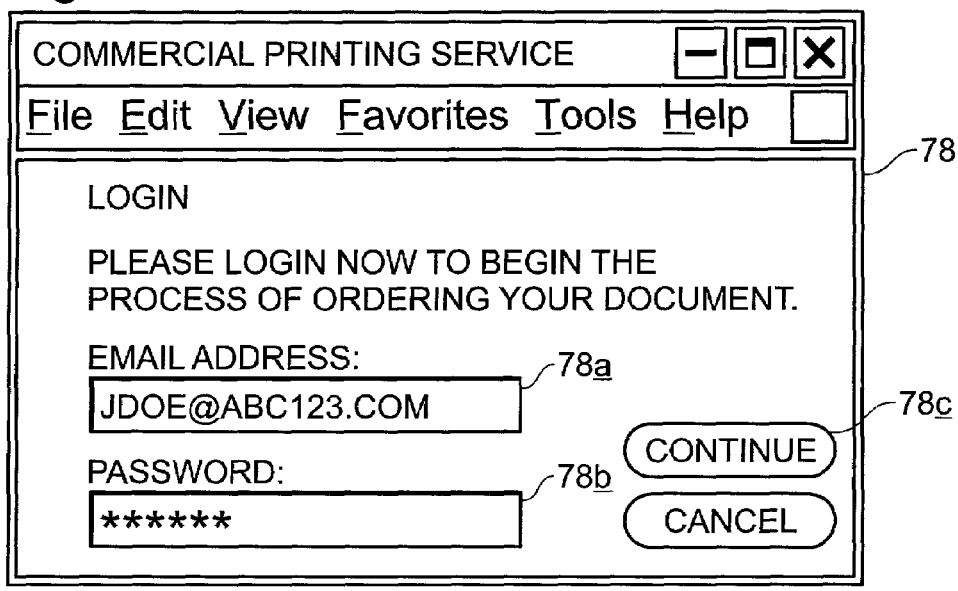
FIG. 8 is a login screen of a print interface displayed on a local client computing device of the system of FIG. 1.
Figure 9:
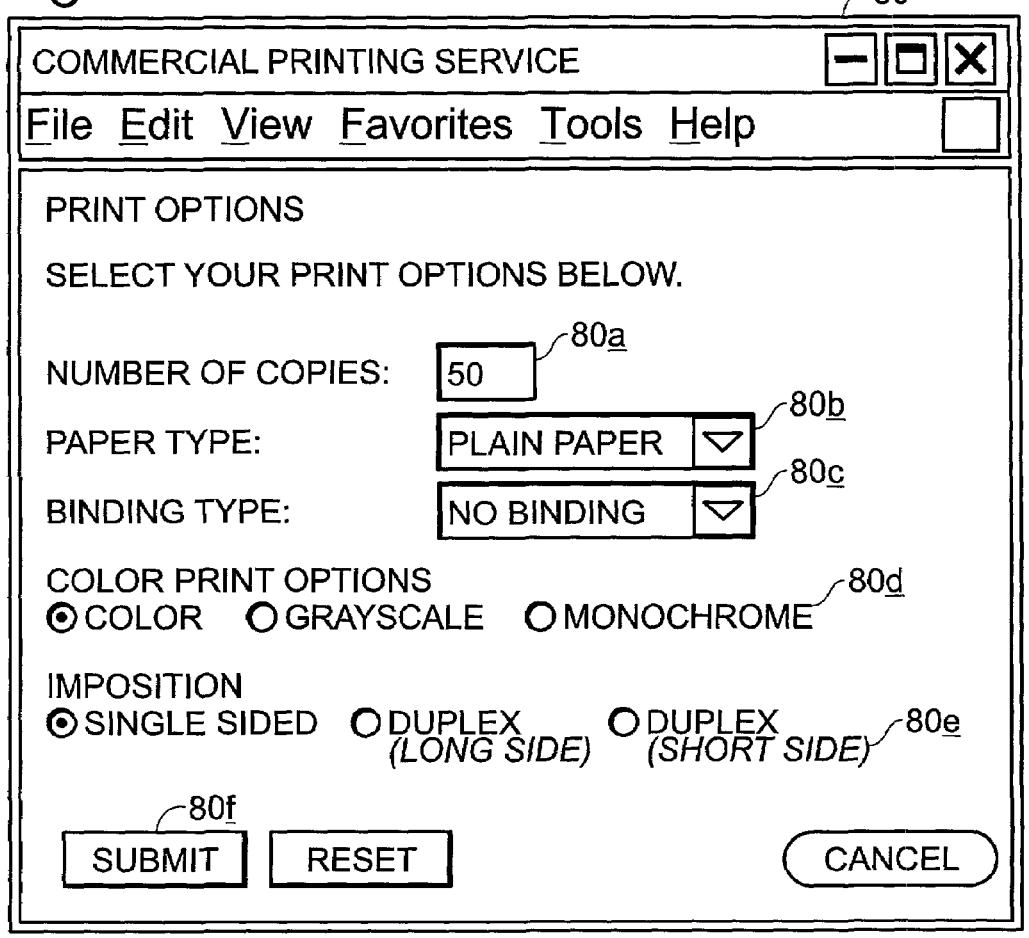
FIG. 9 is a print options screen of the print interface of FIG. 1.

At 106, the method further includes displaying a print dialog box or menu, shown at 66 in FIG. 7. The print dialog box of FIG. 7 is typically generated by local client computing device 12, while the screens depicted in FIGS. 8–12 are typically remotely served by workflow application server 14 or another predetermined remote server. Typically, the print dialog menu includes a selector 68 configured to enable a user to select a commercial print service option 68a in order to send the current print request to print service 13. The identity and status of the printer driver 46 associated with print service 13 are displayed in print service information region 70. Print dialog box 70 also typically includes a page range selection tool 72 and a copies selection tool 74. These printing parameters may be passed to print interface 26, in which the number of copies may appear automatically in selector 80a, shown in FIG. 10, for user editing.

At 108, the method further includes receiving a user selection of print service 13 as a destination remote publisher via selector 68. At 110, the method further includes receiving the user's selection of OK button 76. At 112, the method further includes, via print driver 46, generating or creating a printable file 22 and sending the locked printable file 22 to client initialization program 48. The printable file may be locked, as described above. In addition, it will be appreciated that the file path of the printable file 22 may be passed to client initialization program 48, rather than sending the entire printable file 22 to program 48. At 114, client initialization program 48 is launched. Typically, this is accomplished by a call from print driver 46.

In addition to receiving a user command to print a file from application program 44, the method may include, at 116, a user dragging and dropping a native printable file 22a on a drag and drop program 50 configured to access print service 13. According to the method, drag and drop program 50 receives the print request at 104, and, at 118, passes the native printable file to client initialization program 48. This action typically causes the client initialization program to launch, at 114. Alternatively, drag and drop program 50 may launch client initialization program 48 and instruct the client initialization program as to the file path on local computing device 12 at which the native printable file is stored.

Turning now to FIG. 5, method 100 additionally includes, at 120, requesting a new job from the workflow application server 14 at the workflow application server address, and receiving a user interface URL and repository or upload URL from workflow application server 14. At 122, the method includes launching upload module 56 with the upload URL. At 124, the method includes sending printable file 22, 22a to the repository 16 at the upload URL.

Typically contemporaneous with steps 122 and 124, the method includes at 126, launching browser 52 directed toward the user interface address from which print interface 26 is served. Typically this address is a URL served by print service workflow application server 14, as described above. At 128, the method includes serving print interface 26 from print service workflow application server 14. Print interface 26 is described herein to be "remotely served" because it is served over a wide area network (typically the Internet) from print service workflow application server 14 to local computing device 12. Alternatively, the print interface 26 may be remotely served from another remote server via network 20.

At 130, the method further includes displaying remotely served print interface 26 on display 40 of local computing device 12, via browser 52. Screens associated with remotely served print interface 26 are shown in FIGS. 8–12, while FIG. 7 depicts a locally generated print dialog box. At 132, the method further includes displaying a login screen, shown at 78 in FIG. 8. Login screen 78 typically includes a user identification input pane 78a, configured to request a user ID. In the depicted embodiment, the user ID is an email address. Alternatively, another user ID may be used. Login screen 78 also typically includes a password input pane 78b. In addition, login screen 78 includes a continue button 78c, which the user may select in order to send login information, including user ID and password, to print service workflow application server 14. At workflow application server 14, the login information is typically verified using existing user records stored in an associated database. Typically, the user ID is an email address, which may be used later to update the user as to the status of the print request.

Turning now to FIG. 6, at 134, method 100 includes requesting and receiving printing parameters 24 related to the print request via print interface 26. Printing parameters 24 typically include print options such as number of copies, paper type, binding type, color print options, and imposition. Printing parameters 24 may also include a selected destination remote publisher 18 to which the printable file 22 and associated printing parameters 24 are to be sent. Printing parameters 24 also may include a shipping and/or billing address of the user, and payment information associated with the print request. These print parameters are exemplary, and it should be understood that virtually any other suitable printing parameter also may be requested, including other finishing and binding options, color options, cover options, folding options, etc.

Typically, step 134 is accomplished via one or more of substeps 136–142. At 136, the method typically includes displaying a print options screen, shown at 80 in FIG. 9, and requesting and receiving print options via the print options screen. Print options screen 80 typically includes a number of copies selector 80*a*, a paper type selector 80*b*, a binding type selector 80*c*, a color print options selector 80*d* configured to enable a user to select between color, grayscale, and monochrome, and an imposition selector 80*e* configured to enable a user to select between single-sided, duplex short side, and duplex long side. Print options screen 80 also typically includes a submit button that the user selects after adjusting the print options via the various print options selectors 80*a*–80*e*.

At 138, the method typically includes receiving a selected destination publisher 18 from the user via a publisher selection screen, shown at 82 in FIG. 10. Publisher selection screen typically includes a list of available publishers 82*a*, which is generated by publisher locator 64. List 82*a* typically includes a publisher name 82*b*, publisher address 82*c*, price 82*d*, and estimated shipping time 82*e*. A purchase selection tool 82*f* appears adjacent the information for each remote publisher in list 82*a*, by which the user may choose a selected destination remote publisher 18 to which to send the printable file 22, 22*a* and printing parameters 24.

Figure 11:
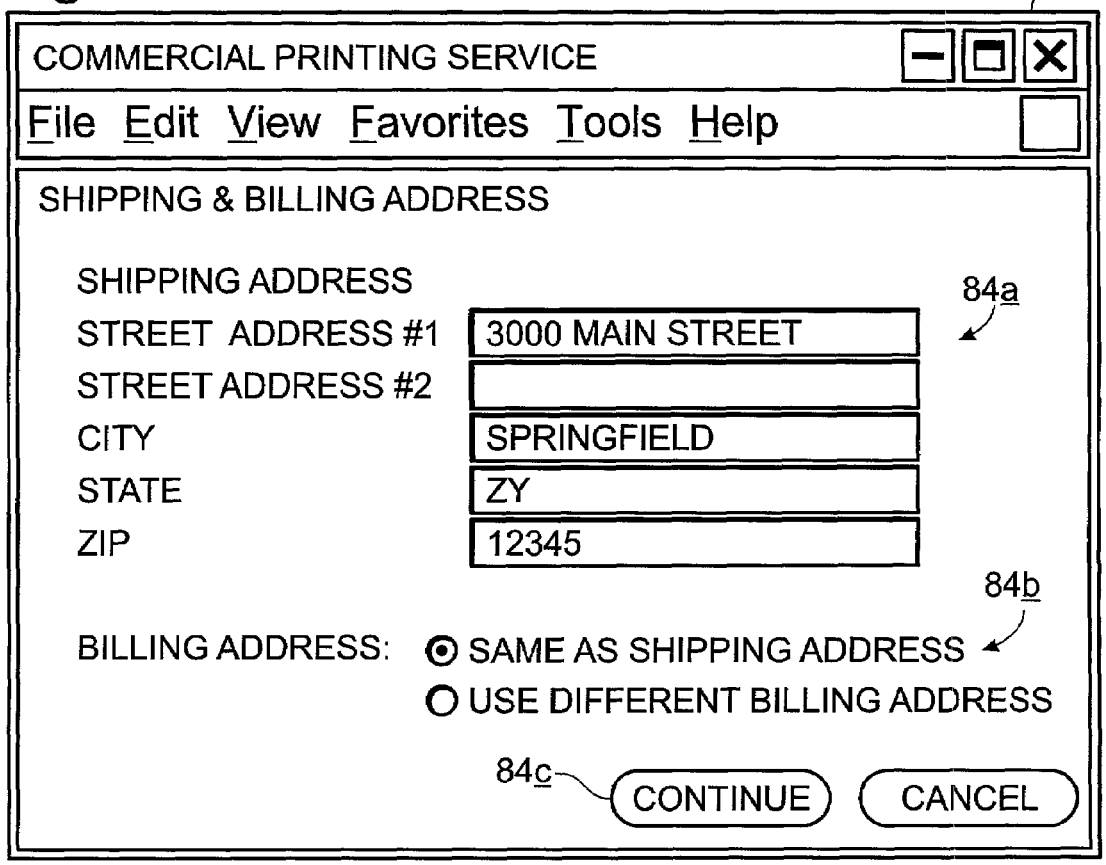
FIG. 11 is an address input screen of the print interface of FIG. 1.

At 140, the method typically further includes receiving a shipping and/or billing address via a address input screen, shown at 84 in FIG. 11. Typically, address input screen 84 includes address input panes 84*a* and a selector 84*b* for indicating whether the shipping and billing address are the same or not. Once the user has entered the desired address, the user typically presses continue button 84*c* to proceed.

Figure 12:
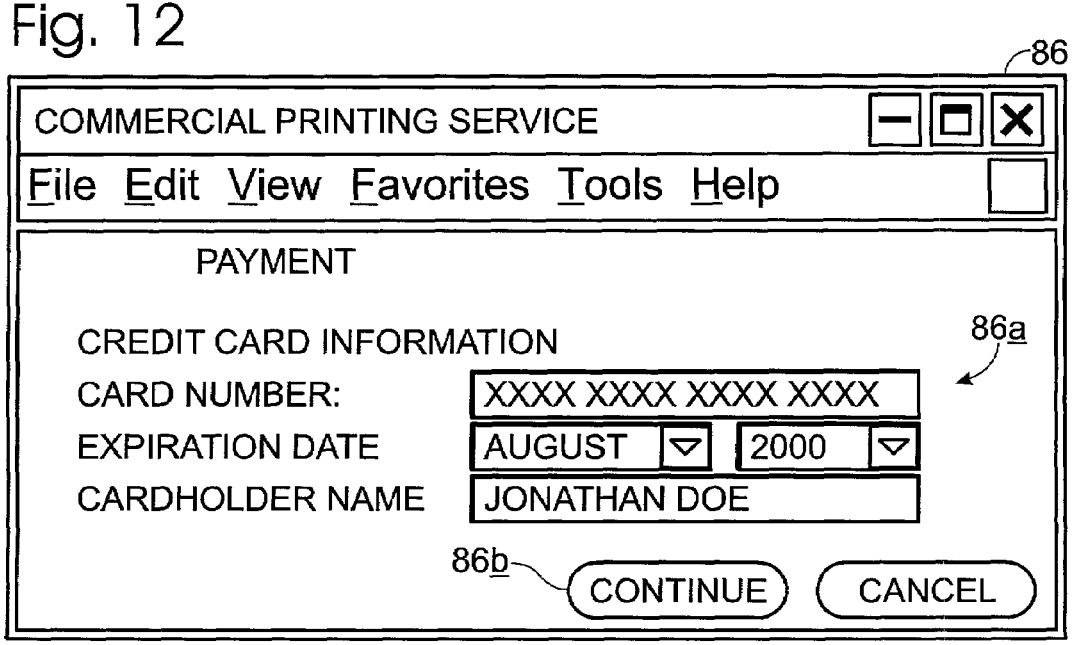
FIG. 12 is a payment screen of the print interface of FIG. 1.

At 142, the method typically includes receiving payment information via a payment screen, shown at 86 in FIG. 12. Payment screen 86 typically includes input panes 86*a* configured to receive payment information such as credit or debit card number, expiration date, and cardholder name. Once the user has input this information, the user typically presses continue button 86*a*.

Method 100 further typically includes, at 144, sending printable file 22, along with printing parameters 24, to the selected destination publisher 18. While only a single publisher is depicted in FIG. 1 for purposes of simplicity, it will be appreciated that a plurality of publishers 18 are typically connected to network 20 and associated with print service 13, as shown in list 82*a* of FIG. 10. Typically, printing parameters 24 are saved on local computing device 12 temporarily as the user progresses through the many screens of print interface 26, and sent to the selected destination publisher 18 contemporaneously with the printable file 22 by the upload plug-in 54 and servlet 56. Typically, workflow application server 14 directs the uploading of the printable file 22 and the printing parameters 24 from the local computing device 12 to the selected remote publisher 18, via paths A, B, C, and D, described above.

Sending the printable file in step 144 is typically accomplished by, at 146, sending the printable file 22 from local computing device 12 to repository 16 via computer network 20 for temporary storage, and at 148 sending the printable file 22 from the repository 16 to the selected destination publisher 18 via computer network 20. Sending the printing parameters 22 in step 144 is typically accomplished by sending the printing parameters 22 from local computing device 12 to workflow application server 14, and at 152, sending the printing parameters 22 from workflow application server 14 to the selected destination publisher 18.

At 144 the method typically includes, at the selected destination publisher, fulfilling the print request by printing printable file 22 according to the printing parameters 24. At 146, the method typically includes shipping the printed document(s) to the shipping address.

In addition, according to another embodiment of the present invention a program storage device, such as a floppy disc, magneto-optical disk, CD-ROM, DVD ROM, flash memory device, or other storage device that is readable by a machine such as a computer may be provided, such that the program storage device tangibly embodies a program of instructions executable by the machine to perform each of the above described methods.

In particular, the device may include instructions executable by the machine to perform a method which includes receiving a print request at a local client computing device, and displaying a remotely served print interface on the local client computing device, the print interface being configured to request a printing parameter relating to the print request. In addition, the method may include sending (1) a printable file corresponding to the print request, and (2) the printing parameter, to a selected remote publisher for printing. The method may also include sending the printable file to the remote publisher by (1) uploading the printable file to a repository, and (2) downloading the printable file from the repository to the remote publisher.

The device may also include instructions executable by the machine to perform a method including the steps of receiving a print request at a local client computing device, creating a printable file in response to the print request, displaying a remotely served print interface on the local client computing device, requesting and receiving via the print interface, a printing parameter relating to the print request, and sending the printable file and the printing parameter to a selected remote publisher for printing.

According to the above described embodiments of the present invention, a user may conveniently access and use a remote print service from a local computing device via a remotely served print interface, thereby saving time and money over prior methods.

INDUSTRIAL APPLICABILITY

The embodiments of the present invention are applicable to commercial print services and other networked computer systems that utilize printers.

While the present invention has been particularly shown and described with reference to the foregoing exemplary embodiments, those skilled in the art will understand that many variations may be made therein without departing from the spirit and scope of the invention as defined in the following claims.

I claim:

1. A method for use in utilizing a print service, the method comprising:

receiving a print request at a local client computing device;

displaying a print interface on the local client computing device, the print interface being downloaded from a remote print service workflow application server and being configured to request a printing parameter relating to the print request;

receiving via the print interface, a printing parameter relating to the print request; and sending the printing parameter to the workflow application server to direct execution of the print request in accordance with the printing parameter.

2. The method of claim 1, wherein the print request is received by an application program executed on the local client computing device.

3. The method of claim 2, further comprising, after receiving the print request via the application program, displaying a print dialog menu on the local client computing device, the print dialog menu including a remote print service option.

4. The method of claim 3, further comprising, in response to user selection of the remote print service option, creating a printable file for the print request.

5. The method of claim 4, wherein the printable file is created by a print service print driver called by the application program.

6. The method of claim 1, wherein the local client computing device includes a browser, the method further comprising, after receiving the print request, opening the browser to a predetermined workflow application server address from which the print interface is remotely served.

7. The method of claim 1, wherein the local client computing device includes a client initialization program, the method further comprising, in response to receiving the print request, opening a connection between the client initialization program and the workflow application server at a predetermined workflow application server address.

8. The method of claim 7, further comprising, downloading a repository address from the workflow application server.

9. The method of claim 8, further comprising, uploading a printable file corresponding to the print request to a repository at the repository address.

10. The method of claim 7, wherein the client initialization program is called by a print service print driver.

11. The method of claim 1, further comprising, sending the printable file from the local client computing device to a repository.

12. The method of claim 11, further comprising, sending the printable file from the repository to the remote publisher.

13. The method of claim 12, further comprising, sending the printing parameter from the workflow application server to the remote publisher.

14. A method for sending a print job to a remote publisher for printing, the method comprising:

receiving a print request at a local client computing device;

creating a printable file in response to the print request;

displaying a remotely served print interface on the local client computing device;

requesting and receiving via the remotely served print interface, a printing parameter relating to the print request;

sending the printing parameter to a selected remote publisher; and sending the printable file to the selected remote publisher for printing in accordance with the printing parameter.

15. A print service system for use by a user, comprising:
a print service workflow application server configured to serve a print interface via a wide area network; and a local computing device configured to receive a print request from the user and, in response, download and display a print interface from the workflow application server via the wide area network, wherein the print interface is configured to receive a printing parameter relating to the print request and to send the printing parameter to a selected remote publisher.

16. The system of claim 15, wherein the local computing device is configured to generate a printable file relating to the print request.

17. The system of claim 16, wherein the printable file is a native file.

18. The system of claim 16, wherein the printable file is a printable file generated by a print driver.

19. The system of claim 15, wherein the remote publisher, print service workflow application server, and local client computing device are configured to communicate via a wide area network.

20. The system of claim 15, wherein the workflow application server is configured to cause the printable file and the printing parameter to be sent from the local computing device to the remote publisher.

21. The system of claim 15, further comprising a repository configured to store the printable file and the printing parameter.

22. The system of claim 21, wherein the workflow application server is configured to instruct the local computing device to send the printable file to the repository, and the remote publisher includes a remote publisher server configured to download the printable file and printing parameter from the repository.

23. A print service system for use by a user, comprising:
a local client computing device configured to connect to a wide area network;

a remote publisher server configured to connect to the wide area network;

a remote repository server and associated database, the repository server being configured to connect to the local client and the remote publisher server via the wide area network; and a remote print service workflow application server configured to connect to the local client and the remote publisher server the wide area network;

wherein the local client computing device is configured to contact the print service workflow application server in response to receiving a print request, and the remote print service workflow application server is configured to instruct the local client computing device to upload a printable file associated with the print request to the remote repository server for storage in the repository database; and wherein the print service workflow application server is configured to instruct the remote publisher server to download the printable file from the remote repository server for printing.

24. A program storage device readable by a machine, the storage device tangibly embodying a program of instructions executable by the machine to perform a method for use in utilizing a print service, the method comprising:

receiving a print request at a local client computing device; and displaying a print interface on the local client computing device, the print interface being downloaded from a remote print service workflow application server and being configured to request a printing parameter relating to the print request;

receiving via the print interface, a printing parameter relating to the print request; and sending the printing parameter to the workflow application server to direct execution of the print request in accordance with the printing parameter.

25. A program storage device readable by a machine, the storage device tangibly embodying a program of instructions executable by the machine to perform a method for use in sending a print job to a remote publisher for printing, the method comprising:

receiving a print request at a local client computing device;

creating a printable file in response to the print request;

displaying a remotely served print interface on the local client computing device;

requesting and receiving via the print interface, a printing parameter relating to the print request;

sending the printing parameter to a selected remote publisher; and sending the printable file to a selected remote publisher for printing in accordance with the printing parameter.

\* \* \* \* \*